(12) United States Patent
Ushijima

(10) Patent No.: US 10,816,224 B2
(45) Date of Patent: Oct. 27, 2020

(54) HEAT-PUMP AIR-CONDITIONING HOT-WATER SUPPLY DEVICE

(71) Applicant: Mitsubishi Electric Corporation, Tokyo (JP)

(72) Inventor: Takahiro Ushijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 94 days.

(21) Appl. No.: 16/084,423

(22) PCT Filed: May 26, 2016

(86) PCT No.: PCT/JP2016/065584
§ 371 (c)(1),
(2) Date: Sep. 12, 2018

(87) PCT Pub. No.: WO2017/203655
PCT Pub. Date: Nov. 30, 2017

(65) Prior Publication Data
US 2019/0072284 A1 Mar. 7, 2019

(51) Int. Cl.
*F24D 17/02* (2006.01)
*F24D 19/10* (2006.01)
(Continued)

(52) U.S. Cl.
CPC ......... *F24D 19/1054* (2013.01); *F24D 17/02* (2013.01); *F24D 19/1087* (2013.01);
(Continued)

(58) Field of Classification Search
CPC .. F24D 19/1087; F24D 19/1054; F24D 17/02; F25B 49/02
See application file for complete search history.

(56) References Cited

U.S. PATENT DOCUMENTS

2013/0145786 A1 6/2013 Tamaki et al.
2013/0180274 A1 6/2013 Tamaki et al.
(Continued)

FOREIGN PATENT DOCUMENTS

JP S59-231354 A 12/1984
JP H07-071839 A 3/1995
(Continued)

OTHER PUBLICATIONS

International Search Report ("ISR") dated Aug. 23, 2016 issued in corresponding International patent application No. PCT/JP2016/065584 (and English translation).
(Continued)

*Primary Examiner* — Elizabeth J Martin
*Assistant Examiner* — Nael N Babaa
(74) *Attorney, Agent, or Firm* — Posz Law Group, PLC

(57) ABSTRACT

A heat-pump air-conditioning hot-water supply device includes a first refrigerant passage connecting a compressor and a decompressor, a second refrigerant passage branching from between the compressor and a first solenoid valve and connecting a second solenoid valve, a hot-water supply heat exchanger, and the decompressor, a pressure sensor configured to measure discharge pressure of the compressor, and a control device configured to adjust an operational frequency of the compressor and adjust an opening degree of a valve of the decompressor. The control device is configured to calculate a condensing temperature from the discharge pressure, and perform operation in one of an air conditioning prioritized mode in which a preset operational frequency of the compressor is changed, and an energy saving prioritized mode in which the opening degree of the valve of the decompressor is changed, when the condensing temperature is not lower than a set condensing temperature.

4 Claims, 9 Drawing Sheets

(51) Int. Cl.
*F25B 13/00* (2006.01)
*F25B 41/04* (2006.01)
*F25B 49/02* (2006.01)

(52) U.S. Cl.
CPC .............. *F25B 13/00* (2013.01); *F25B 41/04* (2013.01); *F25B 49/02* (2013.01); *F25B 49/022* (2013.01); *F24D 2220/046* (2013.01); *F25B 2313/003* (2013.01); *F25B 2313/009* (2013.01); *F25B 2313/021* (2013.01); *F25B 2313/0231* (2013.01); *F25B 2313/0314* (2013.01); *F25B 2313/0315* (2013.01); *F25B 2341/0662* (2013.01); *F25B 2500/19* (2013.01); *F25B 2600/021* (2013.01); *F25B 2600/0253* (2013.01); *F25B 2600/2507* (2013.01); *F25B 2600/2513* (2013.01); *F25B 2600/2519* (2013.01); *F25B 2700/1931* (2013.01); *F25B 2700/2106* (2013.01); *F25B 2700/2115* (2013.01); *F25B 2700/21152* (2013.01); *F25B 2700/21162* (2013.01); *Y02B 30/741* (2013.01)

(56) References Cited

U.S. PATENT DOCUMENTS

| | | | |
|---|---|---|---|
| 2013/0255298 A1 | 10/2013 | Amano | |
| 2013/0269380 A1 | 10/2013 | Ova | |
| 2014/0345310 A1* | 11/2014 | Tamaki | ................. F25B 13/00 62/238.6 |

FOREIGN PATENT DOCUMENTS

| | | |
|---|---|---|
| JP | H11-063661 A | 3/1999 |
| JP | 2012-067937 A | 4/2012 |
| JP | 2012-097910 A | 5/2012 |
| JP | 2013-204935 A | 10/2013 |
| JP | 2013-221650 A | 10/2013 |

OTHER PUBLICATIONS

Extended European Search Report dated Feb. 12, 2018 in the corresponding EP application No. 16867401.8.

* cited by examiner

HEAT-PUMP AIR-CONDITIONING HOT-WATER SUPPLY DEVICE

CROSS REFERENCE TO RELATED APPLICATIONS

This application is a U.S. national stage application of PCT/JP2016/065584 filed on May 26, 2016, the contents of which are incorporated herein by reference.

TECHNICAL FIELD

The present invention relates to a heat-pump air-conditioning hot-water supply device capable of performing cooling operation, heating operation, hot-water supply operation, a simultaneous cooling and hot-water supply operation, and a simultaneous heating and hot-water supply operation.

BACKGROUND ART

A conventional heat-pump air-conditioning hot-water supply device determines that a hot-water supply operation cannot be performed by a heat pump and switches an operation to a hot-water supply operation by a heater when the temperature of external air is low, as control in a simultaneous cooling and hot-water supply operation or a simultaneous heating and hot-water supply operation (Patent Literature 1). Another device switches an operation to a cooling-only operation when the temperature of water reaches a predetermined temperature in the simultaneous cooling and hot-water supply operation (Patent Literature 2). Another device determines whether sufficient capacity can be secured to perform the hot-water supply operation on the basis of an operational frequency and performs any one of the simultaneous cooling and hot-water supply operation and a hot-water supply only operation (Patent Literature 3).

In some conventional heat-pump air-conditioning hot-water supply devices, when the temperature of water at a hot-water supply side increases (for example, 50 to 60 degrees C.) in the simultaneous cooling and hot-water supply operation or the simultaneous heating and hot-water supply operation, the temperature and pressure of refrigerant at a high-pressure side become high, so that a large load is applied to a compressor in some cases. Thus, in some conventional heat-pump air-conditioning hot-water supply devices, excessive rise of a condensing temperature is reduced by reducing the operational frequency of the compressor to protect the compressor and forcibly increasing the opening degree of a decompressor.

CITATION LIST

Patent Literature

Patent Literature 1: Japanese Unexamined Patent Application Publication No. 11-063661
Patent Literature 2: Japanese Unexamined Patent Application Publication No. 59-231354
Patent Literature 3: Japanese Unexamined Patent Application Publication No. 07-071839

SUMMARY OF INVENTION

Technical Problem

In some conventional heat-pump air-conditioning hot-water supply devices, when the temperature and pressure become high at the high-pressure side, cooling capacity or heating capacity as well as the hot-water supply capacity decrease in some cases by reducing the operational frequency of the compressor and forcibly increasing the opening degree of the decompressor at the same time. Specifically, the cooling or heating capacity is forcibly reduced due to factors at the hot-water supply side even when a cooling load or a heating load is present, largely affecting comfort of air conditioning in some cases.

The present invention is intended to solve the above-described problem and provide a heat-pump air-conditioning hot-water supply device that allows selection of whether to prioritize comfort of air conditioning or energy saving of power consumption irrespective of influence on comfort of air conditioning when the temperature and pressure become high at a high-pressure side of a heat pump cycle.

Solution to Problem

A heat-pump air-conditioning hot-water supply device according to an embodiment of the present invention includes a first refrigerant passage connecting a compressor, a first solenoid valve, a flow switching device, an outdoor-side heat exchanger, at least one decompressor, and an indoor-side air-conditioning heat exchanger, a second refrigerant passage branching from between the compressor and the first solenoid valve and connecting a second solenoid valve, a hot-water supply heat exchanger, and the at least one decompressor, a pressure sensor configured to measure discharge pressure of the compressor, and a control device configured to adjust an operational frequency of the compressor and adjust an opening degree of a valve of the at least one decompressor. The control device is configured to calculate a condensing temperature from the discharge pressure, and perform operation in one of an air conditioning prioritized mode in which a preset operational frequency of the compressor is changed, and an energy saving prioritized mode in which the opening degree of the valve of the at least one decompressor is changed, when the condensing temperature is not lower than a set condensing temperature.

Advantageous Effects of Invention

The heat-pump air-conditioning hot-water supply device according to the embodiment of the present invention includes a control unit configured to select between control to reduce the operational frequency of the compressor and control to increase the opening degree of the decompressor to reduce excessive rise of the condensing temperature in a simultaneous cooling and hot-water supply operation or a simultaneous heating and hot-water supply operation. This configuration allows selection of whether to prioritize comfort of air conditioning or energy saving of power consumption.

DESCRIPTION OF EMBODIMENTS

Embodiment 1

Figure 1:
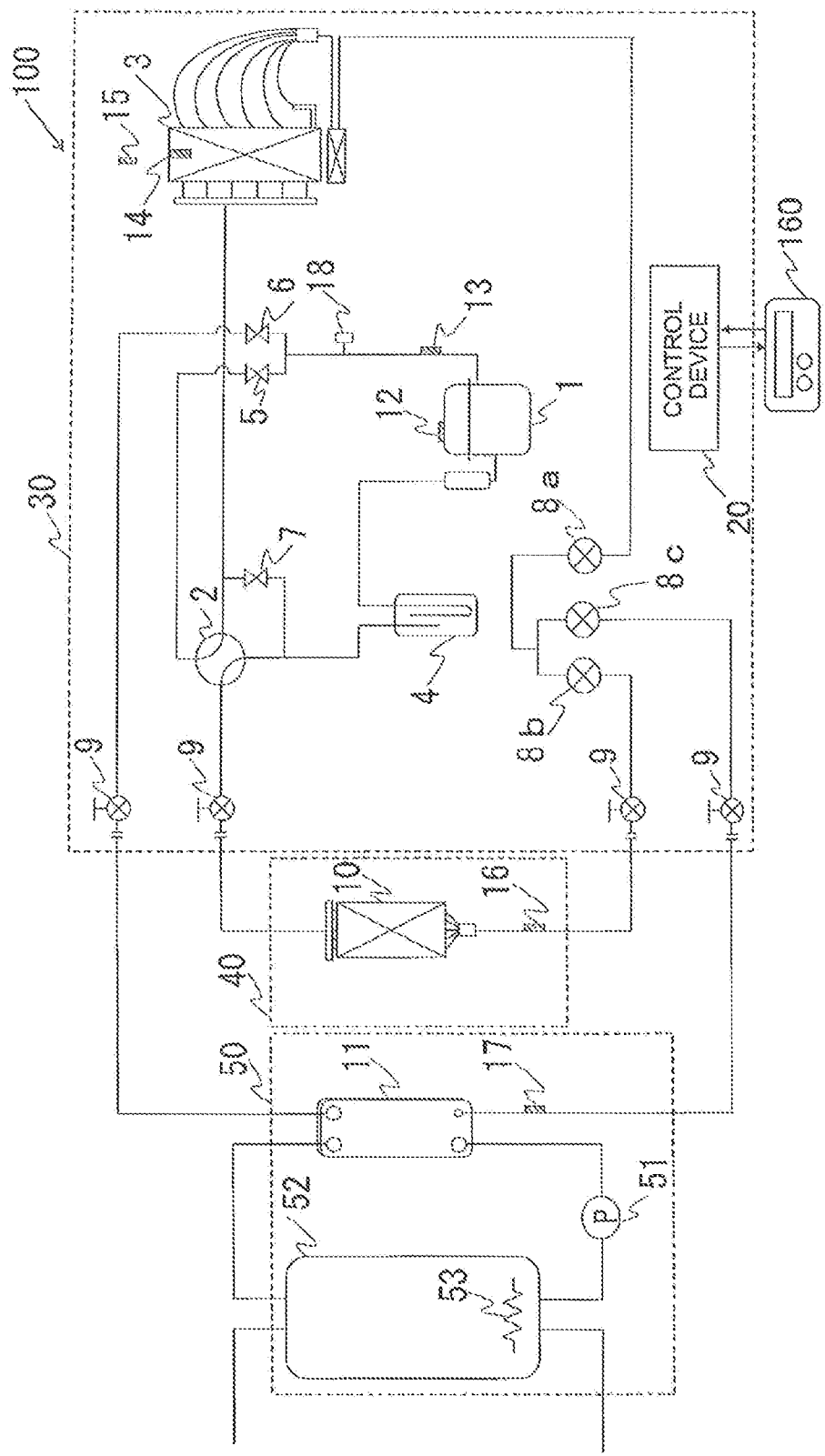
FIG. 1 is a refrigerant circuit diagram of a heat-pump air-conditioning hot-water supply device according to Embodiment 1 of the present invention.

FIG. 1 is a refrigerant circuit diagram of a heat-pump air-conditioning hot-water supply device according to Embodiment 1 of the present invention. As illustrated in FIG. 1, this heat-pump air-conditioning hot-water supply device 100 includes an outdoor unit 30, an indoor unit 40, a water indoor unit 50, and a remote controller 160. The heat-pump air-conditioning hot-water supply device 100 includes a first refrigerant passage connecting a compressor 1, a first solenoid valve 5, a flow switching device 2, an outdoor-side heat exchanger 3, a first decompressor 8a, a second decompressor 8b, an indoor-side air-conditioning heat exchanger 10, and an accumulator 4, and a second refrigerant passage branching from between the compressor 1 and the first solenoid valve 5 and connecting a second solenoid valve 6, a hot-water supply heat exchanger 11, and a third decompressor 8c. In FIG. 1, a third solenoid valve 7 is provided to a circuit bypassing the outdoor-side heat exchanger 3 and the accumulator 4, but installation of this bypassing circuit and the third solenoid valve 7 is optional. In FIG. 1, the accumulator 4 is provided, but installation of the accumulator 4 is optional.

The outdoor unit 30 includes the compressor 1, the flow switching device 2, the accumulator 4, the first solenoid valve 5, the second solenoid valve 6, the first decompressor (LEV) 8a, the second decompressor (LEV) 8b, the third decompressor (LEV) 8c, an external air temperature sensor 15, the outdoor-side heat exchanger 3, a control device 20, and stop valves 9.

The compressor 1 is, for example, a rotary-, scroll-, or vane-type compressor in which capacitance control is possible by inverter control drive, and is configured to compress sucked refrigerant into high-temperature, high-pressure gas refrigerant and discharge the refrigerant.

The compressor 1 is provided with a compressor shell temperature sensor 12, a discharge pipe temperature sensor 13, and a pressure sensor 18. The compressor shell temperature sensor 12 is a temperature measurement unit configured to measure the surface temperature of the compressor 1. The discharge pipe temperature sensor 13 is a temperature measurement unit configured to measure the discharge temperature of refrigerant and provided on a discharge side of the compressor 1. The pressure sensor 18 is configured to measure the discharge pressure of the compressor 1 and act as a condensing temperature measurement unit.

The flow switching device 2 includes, for example, a four-way valve used to switch a passage between a passage connecting the accumulator 4 and the indoor-side air-conditioning heat exchanger 10 and connecting the first solenoid valve 5 and the outdoor-side heat exchanger 3, and a passage connecting the accumulator 4 and the outdoor-side heat exchanger 3 and connecting the first solenoid valve 5 and the indoor-side air-conditioning heat exchanger 10. The switching of the flow switching device 2 changes a direction in which refrigerant flows. The accumulator 4 is configured to store surplus liquid refrigerant and allow gas refrigerant to flow to a suction side of the compressor 1.

The first solenoid valve 5 is a valve configured to allow and cut off passing of refrigerant and provided upstream of the flow switching device 2 on the discharge side of the compressor 1. The second solenoid valve 6 is a valve configured to allow and cut off passing of refrigerant, and provided upstream of the hot-water supply heat exchanger 11 on the discharge side of the compressor 1. The first solenoid valve 5 and the second solenoid valve 6 are provided in parallel downstream of the compressor 1, and thus refrigerant discharged from the compressor 1 flows through one or both of the first solenoid valve 5 and the second solenoid valve 6. The third solenoid valve 7 is a valve configured to allow and cut off passing of refrigerant, and is installed on the circuit bypassing the outdoor-side heat exchanger 3 and the accumulator 4.

The first decompressor 8a, the second decompressor 8b, and the third decompressor 8c are each used to adjust (reduce) the pressure of refrigerant, and each configured to expand the refrigerant through pressure reduction when a corresponding one of the decompressors is opened, and change the direction of the flow of the refrigerant when the corresponding one of the decompressors is closed. The external air temperature sensor 15 is a temperature measurement unit configured to measure the temperature of external air flowing into the outdoor-side heat exchanger 3, and provided on a side of a suction port for the external air. The first decompressor 8a has one end connected with the outdoor-side heat exchanger 3, and the other end connected to join the second decompressor 8b and the third decompressor 8c. The second decompressor 8b has one end connected with the indoor-side air-conditioning heat exchanger 10, and the other end connected to join the first decompressor 8a and the third decompressor 8c. The third decompressor 8c has one end connected with the hot-water supply heat exchanger 11, and the other end connected to join the first decompressor 8a and the second decompressor 8b.

The outdoor-side heat exchanger 3 is, for example, a fin-and-tube heat exchanger, and acts as a condenser configured to transfer heat through heat exchange between refrigerant flowing through the refrigerant circuit and a heat exchange medium such as air, in a cooling operation. The outdoor-side heat exchanger 3 acts as an evaporator configured to evaporate the refrigerant through heat exchange with air in a heating operation, a hot-water supply operation, and a simultaneous heating and hot-water supply operation. The outdoor-side heat exchanger 3 is provided with an outdoor-side heat exchanger temperature sensor 14. The outdoor-side heat exchanger temperature sensor 14 is a temperature measurement unit configured to measure the temperature of refrigerant at the outdoor-side heat exchanger 3.

The control device 20 is configured by, for example, hardware such as a circuit device, or software run on a computation device such as a microcomputer and a central processing unit, which is configured to provide the functionality of the control device 20.

Figure 2:
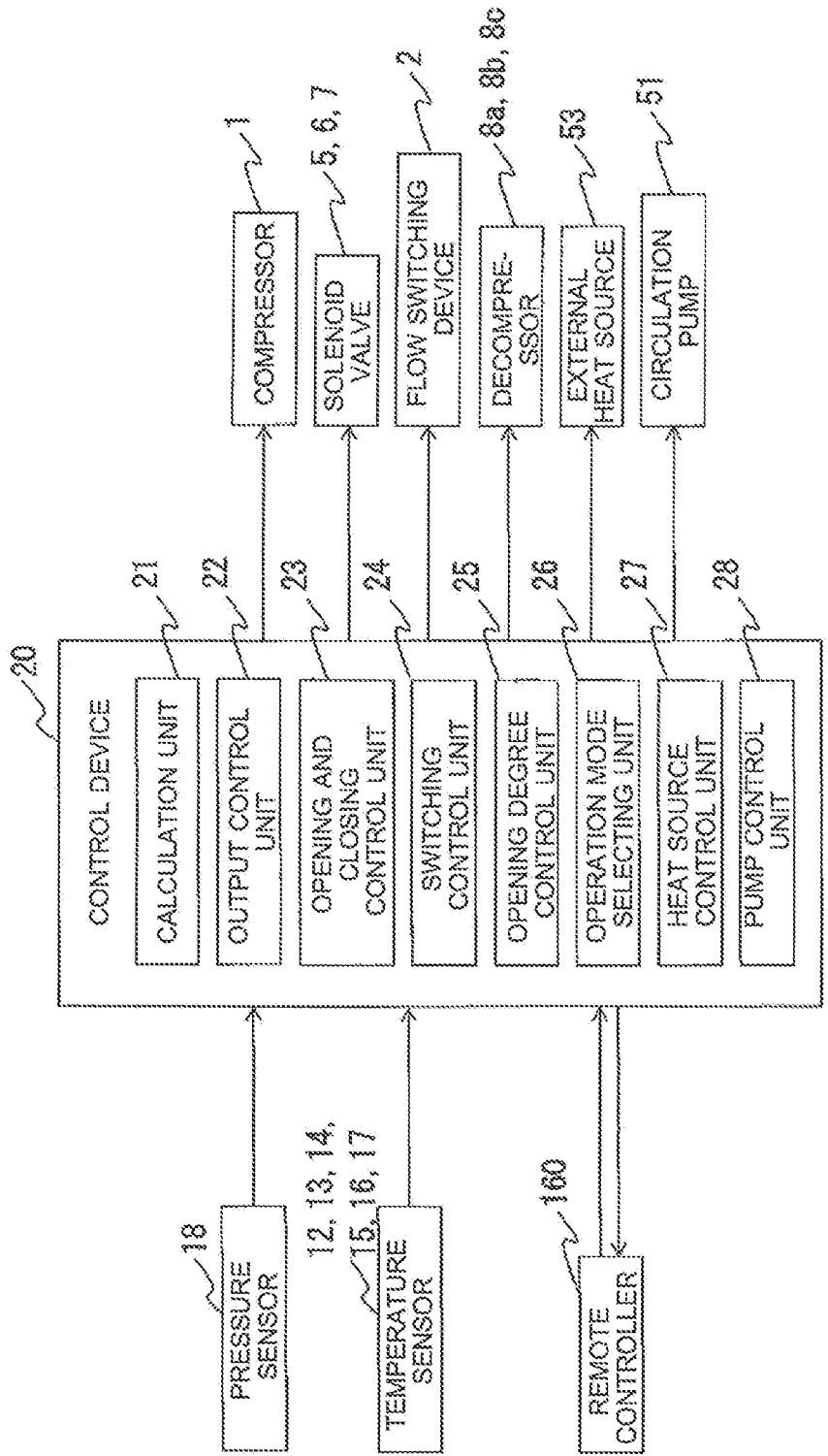
FIG. 2 is a block diagram of a configuration including a control device and components in the heat-pump air-conditioning hot-water supply device according to Embodiment 1 of the present invention.

FIG. 2 is a block diagram of a configuration including the control device and the other components in the heat-pump air-conditioning hot-water supply device according to Embodiment 1 of the present invention. The control device 20 acquires data acquired by sensors such as the pressure sensor 18, the compressor shell temperature sensor 12, the discharge pipe temperature sensor 13, the outdoor-side heat exchanger temperature sensor 14, the external air temperature sensor 15, an indoor-side air-conditioning heat exchanger liquid pipe temperature sensor 16, and a hot-water supply heat exchanger liquid pipe temperature sensor 17. The control device 20 inputs and outputs information from and to the remote controller 160. The control device 20 includes a calculation unit 21, an output control unit 22, an opening and closing control unit 23, a switching control unit 24, an opening degree control unit 25, an operation mode selecting unit 26, a heat source control unit 27, and a pump control unit 28.

The calculation unit 21 calculates a condensing temperature CT from a physical property value of used refrigerant on the basis of a discharge pressure Pd measured by the pressure sensor 18. The condensing temperature CT is compared with a set condensing temperature CTm that is set in advance. The output control unit 22 controls output of the compressor 1 by adjusting the operational frequency of the compressor 1. The opening and closing control unit 23 controls opening and closing of the first solenoid valve 5 and the second solenoid valve 6. The switching control unit 24 switches passages of the flow switching device 2. The opening degree control unit 25 adjusts the opening degree of a valve of each of the first decompressor 8a, the second decompressor 8b, and the third decompressor 8c. The operation mode selecting unit 26 sets an operation mode selected from among a plurality of operation modes by a user through the remote controller 160. The heat source control unit 27 controls activation of an external heat source 53. The pump control unit 28 adjusts flow of water into the hot-water supply heat exchanger 11 by controlling a circulation pump 51 provided to a hot-water supply circuit.

The stop valve 9 is provided to each of a connecting pipe between the indoor-side air-conditioning heat exchanger 10 and the accumulator 4, a connecting pipe between the third decompressor 8c and the hot-water supply heat exchanger 11, a connecting pipe between the second solenoid valve 6 and the hot-water supply heat exchanger 11, and a connecting pipe between the second decompressor 8b and the indoor-side air-conditioning heat exchanger 10. The stop valve 9 is closed to prevent refrigerant present in the outdoor unit 30 from flowing out during work to connect refrigerant pipes.

The indoor unit 40 includes the indoor-side air-conditioning heat exchanger 10 and the indoor-side air-conditioning heat exchanger liquid pipe temperature sensor 16. The indoor-side air-conditioning heat exchanger 10 is, for example, a fin-and-tube heat exchanger, and acts as an evaporator configured to evaporate refrigerant through heat exchange with air in the cooling operation and a simultaneous cooling and hot-water supply operation. The indoor-side air-conditioning heat exchanger 10 acts as a condenser configured to transfer heat through heat exchange between the refrigerant flowing through the refrigerant circuit and a heat exchange medium such as air, in the heating operation and the simultaneous heating and hot-water supply operation. The indoor-side air-conditioning heat exchanger liquid pipe temperature sensor 16 is a temperature measurement unit configured to measure the temperature of liquid refrigerant, and provided to a liquid-side pipe of the indoor-side air-conditioning heat exchanger 10.

The water indoor unit 50 includes the hot-water supply heat exchanger 11, the hot-water supply heat exchanger liquid pipe temperature sensor 17, the circulation pump 51, a hot-water tank 52, the external heat source 53, a flow-in water temperature sensor (not illustrated), and a flow-out water temperature sensor (not illustrated). The hot-water supply heat exchanger 11 is, for example, a plate water heat exchanger. The hot-water supply heat exchanger 11 is sequentially connected with the circulation pump 51 and the hot-water tank 52 through pipes, and serves as a part of a water circuit through which water as a heat exchange medium circulates. The hot-water supply heat exchanger 11 exchanges heat between refrigerant flowing through the hot-water supply heat exchanger 11 and the water flowing through the water circuit to raise the temperature of the water. The circulation pump 51 circulates the water in the circuit of the hot-water tank 52 and the hot-water supply heat exchanger 11. The external heat source 53 is, for example, a heater provided to the hot-water tank 52 and configured to raise the temperature of water inside the hot-water tank 52 by heating. The hot-water supply heat exchanger liquid pipe temperature sensor 17 is a temperature measurement unit provided on a liquid side of a refrigerant pipe, which is an outflow side, of the hot-water supply heat exchanger 11 and configured to measure the temperature of liquid refrigerant. The flow-in water temperature sensor is a temperature measurement unit provided on the water circuit side of the hot-water supply heat exchanger 11 and configured to measure the temperature (entrance water temperature) of water flowing into the hot-water supply heat exchanger 11. The flow-out water temperature sensor is a temperature measurement unit configured to measure the temperature of water flowing out of the hot-water supply heat exchanger 11 (exit water temperature).

The following describes water subjected to heat exchange with refrigerant at the hot-water supply heat exchanger 11. The water whose temperature having increased through the heat exchange with the refrigerant at the hot-water supply heat exchanger 11 flows into the hot-water tank. The water flowing into the hot-water tank is, as intermediate water, subjected to heat exchange with the water inside the hot-water tank without mixing with water in the hot-water tank, and the temperature of the water decreases accordingly. Subsequently, the water whose temperature having decreased through the heat exchange with the water inside the hot-water tank flows out of the hot-water tank and is again supplied to the hot-water supply heat exchanger 11, and the temperature of the water is increased through heat exchange with the refrigerant.

The remote controller 160 is a user interface device (input device, display device) connected in a wired or wirelessly to input and output information between the control device 20 and the user. The user can select an operation mode of the heat-pump air-conditioning hot-water supply device 100 through a selection operation on the remote controller 160. In each operation mode, the control device 20 controls activation of, for example, the compressor 1, the flow switching device 2, the first solenoid valve 5, the second solenoid valve 6, the first decompressor 8a, the second decompressor 8b, and the third decompressor 8c. For example, operation modes for reducing excessive rise of a condensing temperature include an air conditioning prioritized mode in which comfort of air conditioning is prioritized by changing the operational frequency of the compressor 1, and an energy saving prioritized mode in which energy saving of power consumption is prioritized by adjusting the opening degrees of, for example, the first decompressor 8a, the second decompressor 8b, and the third decompressor 8c. More specifically, in the air conditioning prioritized mode, the output control unit 22 reduces the operational frequency of the compressor 1, and the opening degree control unit 25 does not increase the opening degrees of the decompressors. Thus, in this mode, the operational frequency of the compressor is likely to reduce, and switching to a cooling-only operation or a heating-only operation can be achieved early. In the energy saving prioritized mode, more specifically, the opening degree control unit 25 increases the opening degrees of the decompressors. Thus, in this mode, excessive rise of the condensing temperature can be reduced and the frequency of the compressor can be maintained high, thereby allowing the simultaneous cooling and hot-water supply operation or the simultaneous heating and hot-water supply operation to continue as long as possible.

Figure 3:
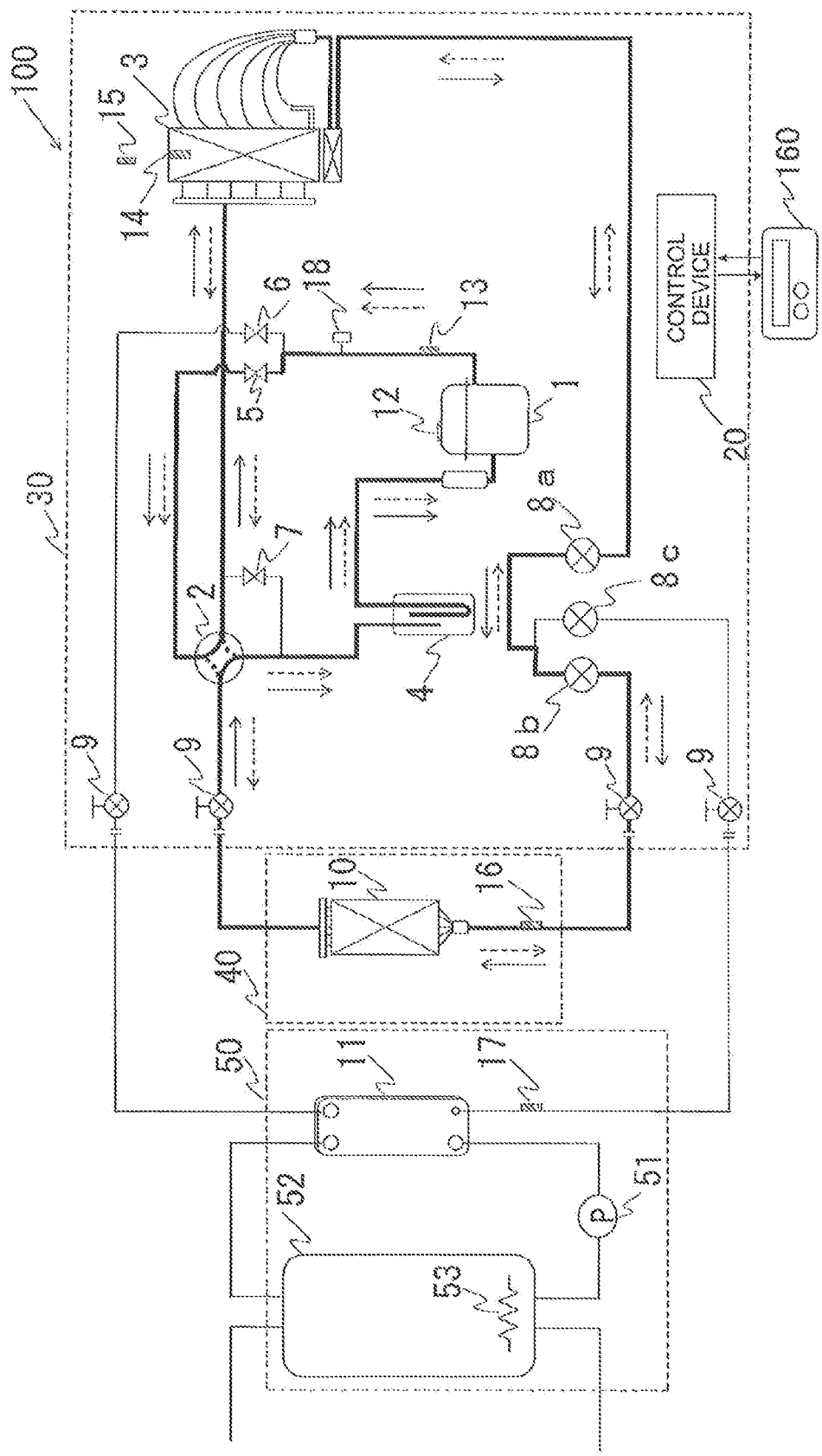
FIG. 3 is a refrigerant circuit diagram of the heat-pump air-conditioning hot-water supply device in a cooling operation or a heating operation, according to Embodiment 1 of the present invention.

FIG. 3 is a refrigerant circuit diagram of the heat-pump air-conditioning hot-water supply device in the cooling operation or the heating operation, according to Embodiment 1 of the present invention. The following describes operational procedures of the cooling operation and the heating operation with reference to FIG. 3. In FIG. 3, an arrow with a solid line represents a direction in which refrigerant flows in cooling, and an arrow with a dashed line represents a direction in which refrigerant flows in heating.

In the refrigerant circuit in the cooling operation and the heating operation, the compressor 1, the first solenoid valve 5, the flow switching device 2, the outdoor-side heat exchanger 3, the first decompressor 8a, the second decompressor 8b, the indoor-side air-conditioning heat exchanger 10, and the accumulator 4 are connected with each other.

In the cooling operation, the switching control unit 24 switches the flow switching device 2 to a passage illustrated with a solid line. In the cooling operation, the opening and closing control unit 23 opens the first solenoid valve 5 and closes the second solenoid valve 6 and the third solenoid valve 7. In the cooling operation, the opening degree control unit 25 fully opens the first decompressor 8a, adjusts the opening degree of the second decompressor 8b, and closes the third decompressor 8c.

In the heating operation, the switching control unit 24 switches the flow switching device 2 to a passage illustrated with a dashed line. In the heating operation, the opening and closing control unit 23 opens the first solenoid valve 5 and closes the second solenoid valve 6 and the third solenoid valve 7. In the heating operation, the opening degree control unit 25 fully opens the second decompressor 8b, adjusts the opening degree of the first decompressor 8a, and closes the third decompressor 8c.

In the cooling operation, high-temperature, high-pressure gas refrigerant discharged from the compressor 1 sequentially passes through the first solenoid valve 5 and the flow switching device 2 and flows into the outdoor-side heat exchanger 3. The refrigerant having flowed into the outdoor-side heat exchanger 3 is turned into middle-temperature, high-pressure liquid refrigerant through heat exchange with air, and flows out of the outdoor-side heat exchanger 3. The middle-temperature, high-pressure liquid refrigerant having flowed out of the outdoor-side heat exchanger 3 passes through the first decompressor 8a, is expanded through pressure reduction into low-temperature, low-pressure two-phase gas-liquid refrigerant at the second decompressor 8b, and then flows into the indoor-side air-conditioning heat exchanger 10. The refrigerant having flowed into the indoor-side air-conditioning heat exchanger 10 is turned into low-temperature, low-pressure gas refrigerant through heat exchange with air, and flows out of the indoor-side air-conditioning heat exchanger 10. The refrigerant having flowed out of the indoor-side air-conditioning heat exchanger 10 returns to the compressor 1 through the flow switching device 2 and the accumulator 4.

In the heating operation, high-temperature, high-pressure gas refrigerant discharged from the compressor 1 sequentially passes through the first solenoid valve 5 and the flow switching device 2, and flows into the indoor-side air-conditioning heat exchanger 10. The refrigerant having flowed into the indoor-side air-conditioning heat exchanger 10 is turned into middle-temperature, high-pressure liquid refrigerant through heat exchange with air and flows out of the indoor-side air-conditioning heat exchanger 10. The middle-temperature, high-pressure liquid refrigerant having flowed out of the indoor-side air-conditioning heat exchanger 10 passes through the second decompressor 8b, is expanded into low-temperature, low-pressure two-phase gas-liquid refrigerant through pressure reduction at the first decompressor 8a, and flows into the outdoor-side heat exchanger 3. The refrigerant having flowed into the outdoor-side heat exchanger 3 is turned into low-temperature, low-pressure gas refrigerant through heat exchange with air, and flows out of the outdoor-side heat exchanger 3. The refrigerant having flowed out of the outdoor-side heat exchanger 3 returns to the compressor 1 through the flow switching device 2 and the accumulator 4.

Figure 4:
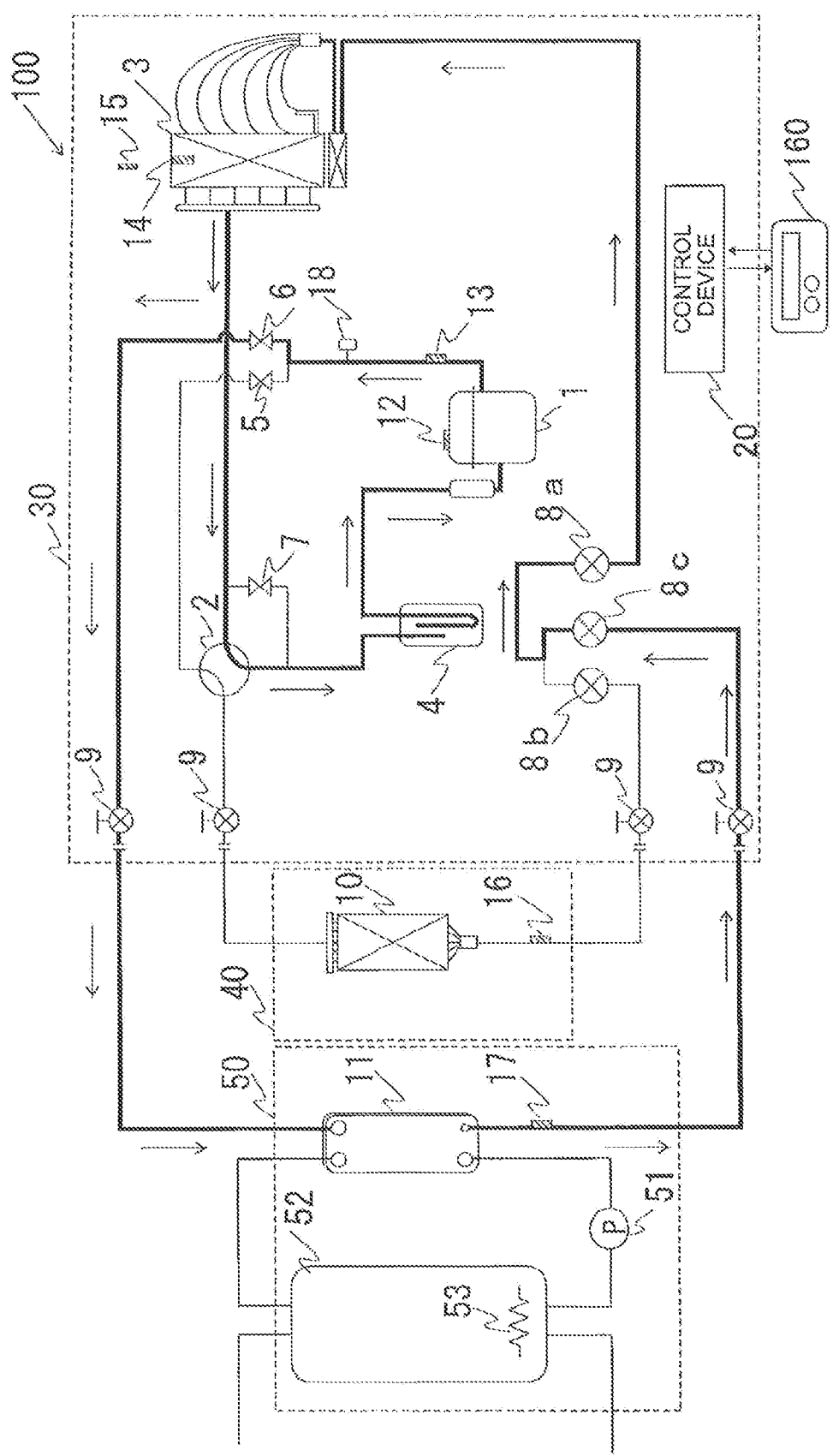
FIG. 4 is a refrigerant circuit diagram of the heat-pump air-conditioning hot-water supply device in a hot-water supply operation, according to Embodiment 1 of the present invention.

FIG. 4 is a refrigerant circuit diagram of the heat-pump air-conditioning hot-water supply device in the hot-water supply operation, according to Embodiment 1 of the present invention. The following describes an operational procedure of the hot-water supply operation with reference to FIG. 4. In FIG. 4, an arrow represents a direction in which refrigerant flows.

In the refrigerant circuit in the hot-water supply operation, the compressor 1, the second solenoid valve 6, the hot-water supply heat exchanger 11, the third decompressor 8c, the first decompressor 8a, the outdoor-side heat exchanger 3, the flow switching device 2, and the accumulator 4 are connected with each other.

In the hot-water supply operation, the opening and closing control unit 23 opens the second solenoid valve 6 and closes the first solenoid valve 5 and the third solenoid valve 7. The opening degree control unit 25 fully opens the third decompressor 8c, closes the second decompressor 8b, and adjusts the opening degree of the first decompressor 8a.

In the hot-water supply operation, high-temperature, high-pressure gas refrigerant discharged from the compressor 1 flows into the hot-water supply heat exchanger 11 through the second solenoid valve 6. The refrigerant having flowed into the hot-water supply heat exchanger 11 is turned into middle-temperature, high-pressure liquid refrigerant through heat exchange with water as a heat exchange medium and flows out of the hot-water supply heat exchanger 11. The middle-temperature, high-pressure liquid refrigerant having flowed out of the hot-water supply heat exchanger 11 passes through the third decompressor 8c, is expanded into low-temperature, low-pressure two-phase gas-liquid refrigerant through pressure reduction at the first decompressor 8a, and flows into the outdoor-side heat exchanger 3. The refrigerant having flowed into the outdoor-side heat exchanger 3 is turned into low-temperature, low-pressure gas refrigerant through heat exchange with air, and flows out of the outdoor-side heat exchanger 3. The refrigerant having flowed out of the outdoor-side heat exchanger 3 returns to the compressor 1 through the flow switching device 2 and the accumulator 4.

Figure 5:
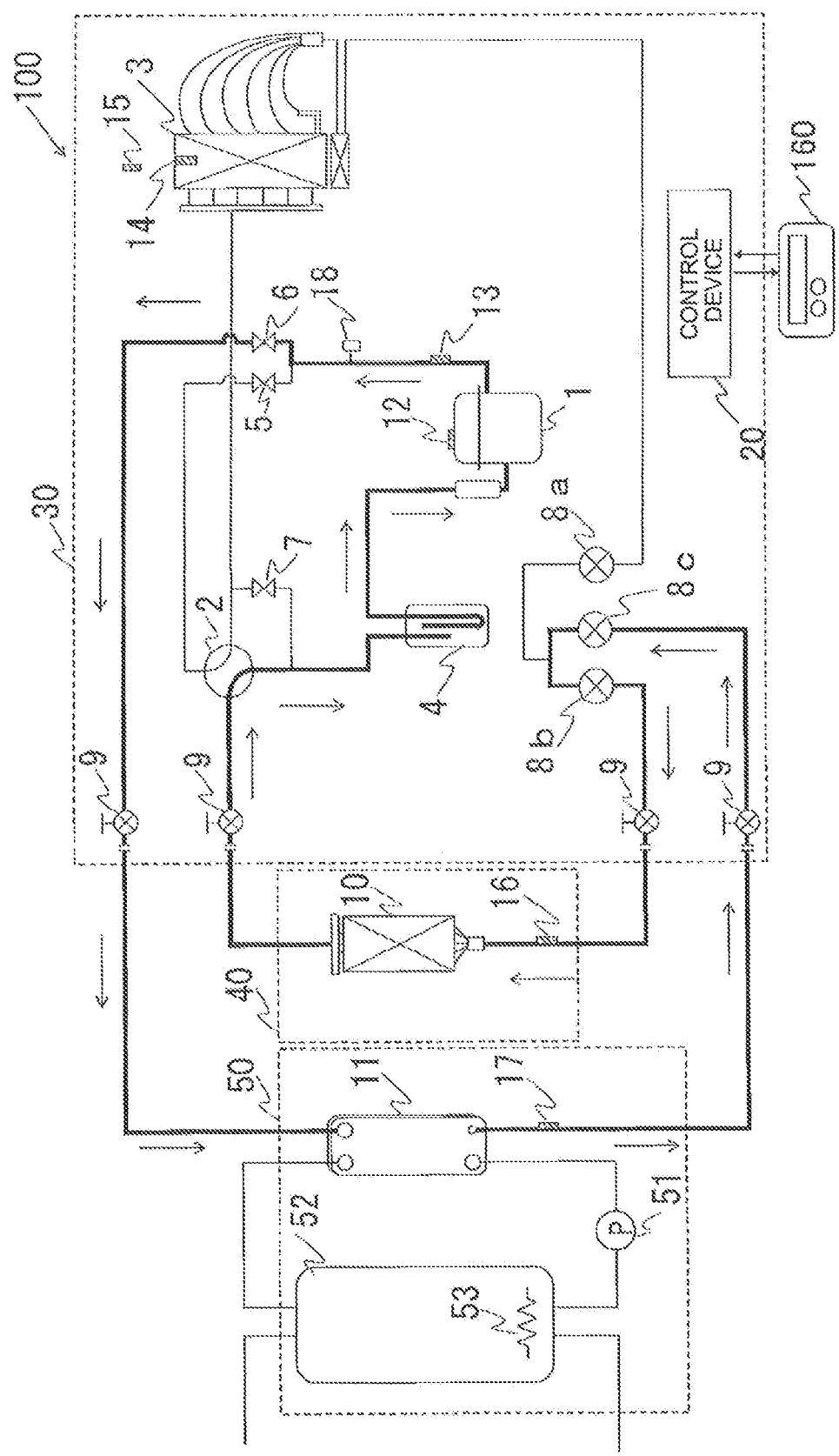
FIG. 5 is a refrigerant circuit diagram of the heat-pump air-conditioning hot-water supply device in a simultaneous cooling and hot-water supply operation, according to Embodiment 1 of the present invention.

FIG. 5 is a refrigerant circuit diagram of the heat-pump air-conditioning hot-water supply device in the simultaneous cooling and hot-water supply operation, according to Embodiment 1 of the present invention. The following describes an operational procedure of the simultaneous cooling and hot-water supply operation with reference to FIG. 5. In FIG. 5, an arrow represents a direction in which refrigerant flows.

In the refrigerant circuit in the simultaneous cooling and hot-water supply operation, the compressor 1, the second solenoid valve 6, the hot-water supply heat exchanger 11, the third decompressor 8c, the second decompressor 8b, the indoor-side air-conditioning heat exchanger 10, the flow switching device 2, and the accumulator 4 are connected with each other.

In the simultaneous cooling and hot-water supply operation, the opening and closing control unit 23 opens the second solenoid valve 6 and closes the first solenoid valve 5 and the third solenoid valve 7. In the cooling operation, the opening degree control unit 25 fully opens the third decompressor 8c, closes the first decompressor 8a, and adjusts the opening degree of the second decompressor 8b.

In the simultaneous cooling and hot-water supply operation, high-temperature, high-pressure gas refrigerant discharged from the compressor 1 flows into the hot-water supply heat exchanger 11 through the second solenoid valve 6. The refrigerant having flowed into the hot-water supply heat exchanger 11 is turned into middle-temperature, high-pressure liquid refrigerant through heat exchange with water as a heat exchange medium, and flows out of the hot-water supply heat exchanger 11. The middle-temperature, high-pressure liquid refrigerant having flowed out of the hot-water supply heat exchanger 11 passes through the third decompressor 8c, is expanded into low-temperature, low-pressure two-phase gas-liquid refrigerant through pressure reduction at the second decompressor 8b, and flows into the indoor-side air-conditioning heat exchanger 10. The refrigerant having flowed into the indoor-side air-conditioning heat exchanger 10 is turned into low-temperature, low-pressure gas refrigerant through heat exchange with air, and flows out of the indoor-side air-conditioning heat exchanger 10. The refrigerant having flowed out of the indoor-side air-conditioning heat exchanger 10 returns to the compressor 1 through the flow switching device 2 and the accumulator 4.

In a circuit at the simultaneous cooling and hot-water supply operation, the opening degree of the valve of the first decompressor 8a is closed to prevent flow of refrigerant as main stream into the outdoor-side heat exchanger 3. Then, a side of the flow switching device 2 of the outdoor-side heat exchanger 3 is connected with the suction side of the compressor by closing the first solenoid valve 5 and opening the third solenoid valve 7, and thus low pressure atmosphere is achieved at the outdoor-side heat exchanger 3, thereby preventing accumulation of the refrigerant at the outdoor-side heat exchanger 3.

Figure 6:
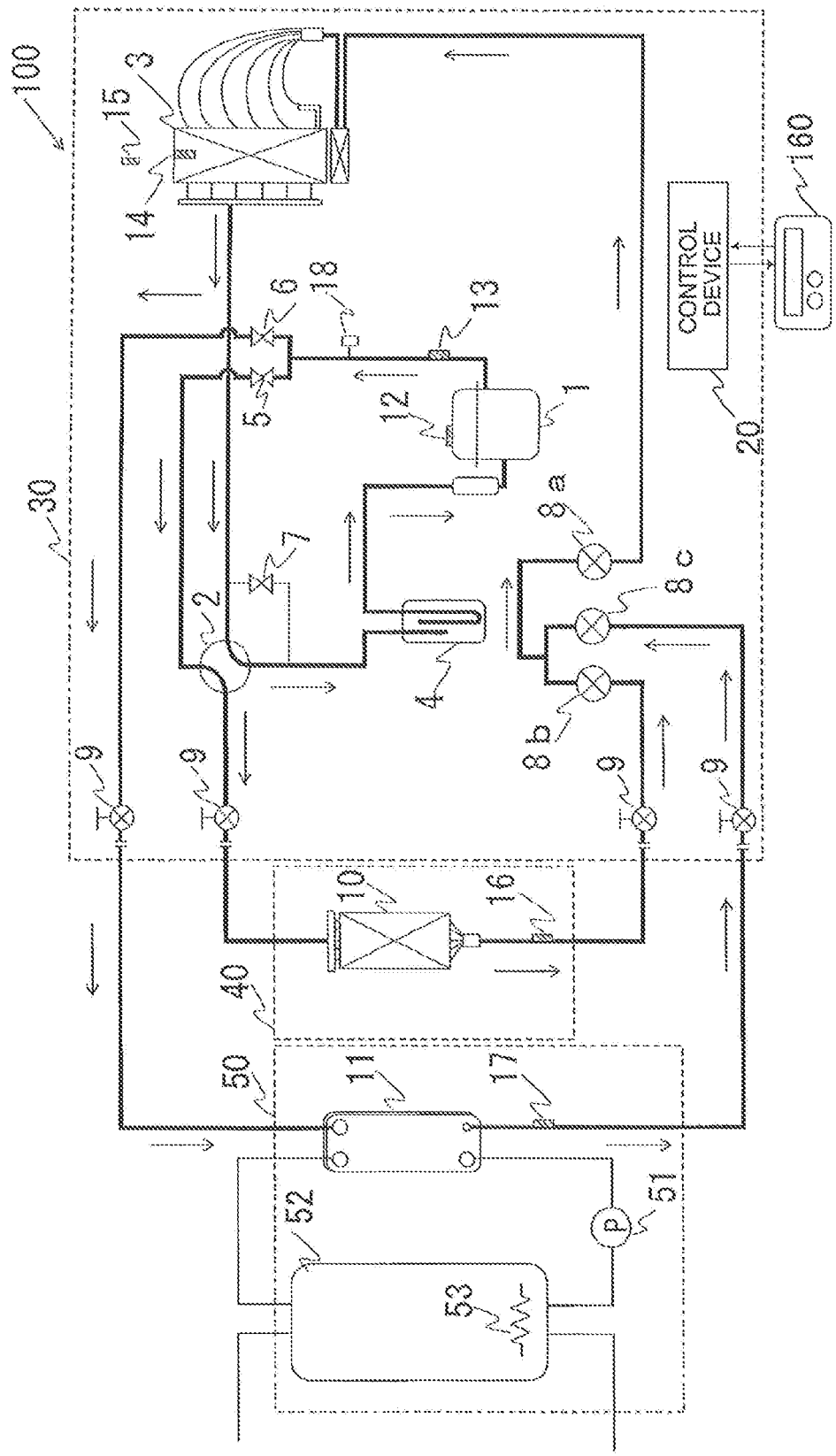
FIG. 6 is a refrigerant circuit diagram of the heat-pump air-conditioning hot-water supply device in a simultaneous heating and hot-water supply operation, according to Embodiment 1 of the present invention.

FIG. 6 is a refrigerant circuit diagram of the heat-pump air-conditioning hot-water supply device in the simultaneous heating and hot-water supply operation, according to Embodiment 1 of the present invention. The following describes an operational procedure of the simultaneous heating and hot-water supply operation with reference to FIG. 6. In FIG. 6, an arrow represents a direction in which refrigerant flows.

In the simultaneous heating and hot-water supply operation, the refrigerant circuit branches into two. One connects the compressor 1, the second solenoid valve 6, the hot-water supply heat exchanger 11, the third decompressor 8c, the first decompressor 8a, the outdoor-side heat exchanger 3, the flow switching device 2, and the accumulator 4, and the other connects the compressor 1, the first solenoid valve 5, the flow switching device 2, the indoor-side air-conditioning heat exchanger 10, the second decompressor 8b, the first decompressor 8a, the outdoor-side heat exchanger 3, the flow switching device 2, and the accumulator 4.

In the simultaneous heating and hot-water supply operation, the opening and closing control unit 23 opens the first solenoid valve 5 and the second solenoid valve 6 and closes the third solenoid valve 7. The opening degree control unit 25 fully opens the first decompressor 8a and adjusts the opening degrees of the second decompressor 8b and the third decompressor 8c.

In the simultaneous heating and hot-water supply operation, high-temperature, high-pressure gas refrigerant discharged from the compressor 1 branches into two, and one flows into the hot-water supply heat exchanger 11 through the second solenoid valve 6. The refrigerant having flowed into the hot-water supply heat exchanger 11 is turned into middle-temperature, high-pressure liquid refrigerant through heat exchange with water as a heat exchange medium, and flows out of the hot-water supply heat exchanger 11. The middle-temperature, high-pressure liquid refrigerant having flowed out of the hot-water supply heat exchanger 11 merges with the other branched refrigerant through the third decompressor 8c. The other high-temperature, high-pressure gas refrigerant discharged from the compressor 1 flows into the indoor-side air-conditioning heat exchanger 10 through the first solenoid valve 5. The refrigerant having flowed into the indoor-side air-conditioning heat exchanger 10 is turned into middle-temperature, high-pressure liquid refrigerant through heat exchange with air, and flows out of the indoor-side air-conditioning heat exchanger 10. The middle-temperature, high-pressure liquid refrigerant having flowed out of the indoor-side air-conditioning heat exchanger 10 is expanded through pressure reduction at the second decompressor 8b, and merges with the one branched refrigerant. The low-temperature, low-pressure refrigerant subjected to the pressure reduction expansion through each of the second decompressor 8b and the third decompressor 8c merges together and flows into the outdoor-side heat exchanger 3 through the first decompressor 8a. The refrigerant having flowed into the outdoor-side heat exchanger 3 is turned into low-temperature, low-pressure gas refrigerant through heat exchange with air, and flows out of the outdoor-side heat exchanger 3. The refrigerant having flowed out of the outdoor-side heat exchanger 3 returns to the compressor 1 through the flow switching device 2 and the accumulator 4.

The following describes a control operational procedure of the heat-pump air-conditioning hot-water supply device 100. The heat-pump air-conditioning hot-water supply device 100 can perform the simultaneous cooling and hot-water supply operation and the simultaneous heating and hot-water supply operation, selectively in the air conditioning prioritized mode in which comfort of air conditioning is prioritized or the energy saving prioritized mode in which energy saving of power consumption is prioritized.

Figure 7:
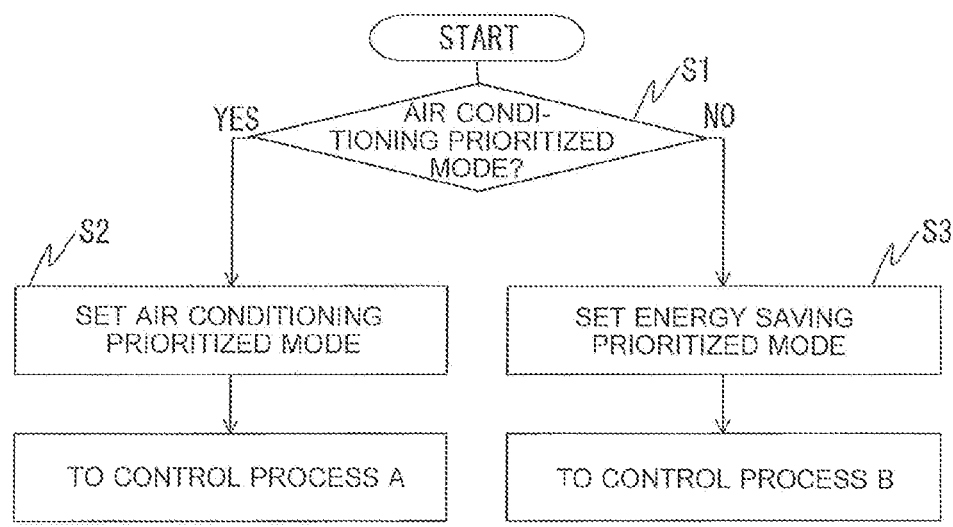
FIG. 7 is a diagram illustrating selection of an operation mode of the heat-pump air-conditioning hot-water supply device according to Embodiment 1 of the present invention.

FIG. 7 is a diagram illustrating selection of the operation modes of the heat-pump air-conditioning hot-water supply device according to Embodiment 1 of the present invention. The user selects, through the remote controller 160, the air conditioning prioritized mode in which comfort of air conditioning is prioritized, or the energy saving prioritized mode in which energy saving of power consumption is prioritized (step S1). The result of the selection is transmitted to the control device 20, the heat-pump air-conditioning hot-water supply device 100 proceeds control process A by setting the air conditioning prioritized mode (step S2), or proceeds control process B by setting the energy saving prioritized mode (step S3).

Figure 8:
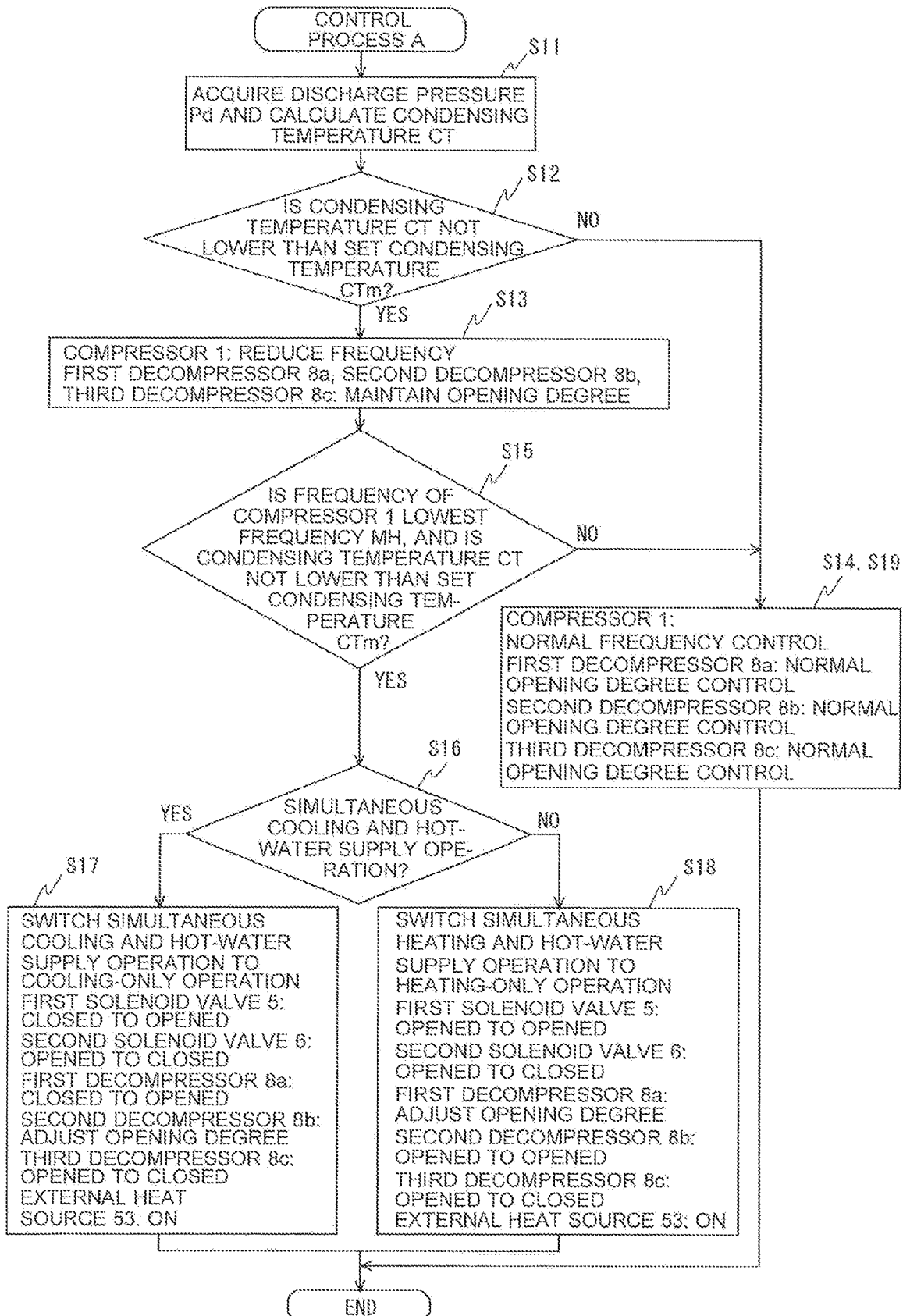
FIG. 8 is a flowchart of a process of determination of whether high-temperature hot-water supply or other hot-water supply (normal hot-water supply) is performed in an air conditioning prioritized mode in which comfort of air conditioning is prioritized at the heat-pump air-conditioning hot-water supply device, according to Embodiment 1 of the present invention.

FIG. 8 is a flowchart of a process of determination of whether high-temperature hot-water supply or other hot-water supply (normal hot-water supply) is performed in the air conditioning prioritized mode in which comfort of air conditioning is prioritized at the heat-pump air-conditioning hot-water supply device, according to Embodiment 1 of the present invention. The following first describes a control operational procedure in the air conditioning prioritized mode.

When the air conditioning prioritized mode (control process A) is started, the calculation unit 21 first acquires the discharge pressure Pd of the compressor 1 and calculates the condensing temperature CT (step S11). Subsequently, the calculation unit 21 determines whether the condensing temperature CT is not lower than the set condensing temperature CTm (step S12). The set condensing temperature CTm for the condensing temperature is, for example, a maximum value (for example, 60 degrees C.) of a proper use range of the compressor 1. In step S12, when the condensing temperature CT is not lower than the set condensing temperature CTm, the output control unit 22 reduces the frequency of the compressor 1 (step S13). At this time, the opening degrees of the valves of the first decompressor 8a, the second decompressor 8b, and the third decompressor 8c are maintained. In step S12, when the condensing temperature CT is lower than the set condensing temperature CTm, the output of the compressor 1 and the opening degrees of the first decompressor 8a, the second decompressor 8b, and the third decompressor 8c are controlled for the normal simultaneous cooling and hot-water supply operation or the normal simultaneous heating and hot-water supply operation (step S14).

Subsequently, when the operational frequency of the compressor 1 has decreased to a set frequency (for example, a lowest frequency MH), the calculation unit 21 determines whether the condensing temperature CT is not lower than the set condensing temperature CTm (step S15).

In step S15, when the condensing temperature CT is not lower than the set condensing temperature CTm, the calculation unit 21 determines whether the simultaneous cooling and hot-water supply operation or the simultaneous heating and hot-water supply operation is performed (step S16).

In step S16, when the simultaneous cooling and hot-water supply operation is performed, the control device 20 switches from the simultaneous cooling and hot-water supply operation to the cooling-only operation, and the heat source control unit 27 activates the external heat source 53 for the hot-water supply operation (step S17). In the switching from the simultaneous cooling and hot-water supply operation to the cooling-only operation, the opening and closing control unit 23 opens the first solenoid valve 5, which is closed, and closes the second solenoid valve 6, which is opened. The opening degree control unit 25 fully opens the first decompressor 8a, which is closed, closes the third decompressor 8c, which is fully opened, and adjusts the opening degree of the second decompressor 8b.

In step S16, when the simultaneous heating and hot-water supply operation is performed, the control device 20 switches from the simultaneous heating and hot-water supply operation to the heating-only operation, and the heat source control unit 27 activates the external heat source 53 for the hot-water supply operation (step S18). In the switching from the simultaneous heating and hot-water supply operation to the heating-only operation, the opening and closing control unit 23 maintains the first solenoid valve 5 to be opened, and closes the second solenoid valve 6. The opening degree control unit 25 closes the third decompressor 8c, which is opened. The opening degree control unit 25 maintains the second decompressor 8b to be fully opened and the opening degree of the first decompressor 8a to be adjusted.

In step S15, when the condensing temperature CT is lower than the set condensing temperature CTm, which is a normal hot-water supply state, the output of the compressor 1 and the opening degrees of the first decompressor 8a, the second decompressor 8b, and the third decompressor 8c are controlled for the normal simultaneous cooling and hot-water supply operation or the normal simultaneous heating and hot-water supply operation (step S19).

As described above, in the control in which comfort of air conditioning is prioritized, the output control unit 22 reduces the operational frequency of the compressor 1, and the opening degree control unit 25 does not increase the opening degrees of the decompressors. Thus, the operational frequency of the compressor is likely to reduce, and switching to the cooling-only operation or the heating-only operation can be achieved early. Consequently, a time is minimized during which cooling capacity or heating capacity decreases, thereby maintaining comfort of air conditioning. The hot-water supply operation is performed by using the external heat source 53.

Figure 9:
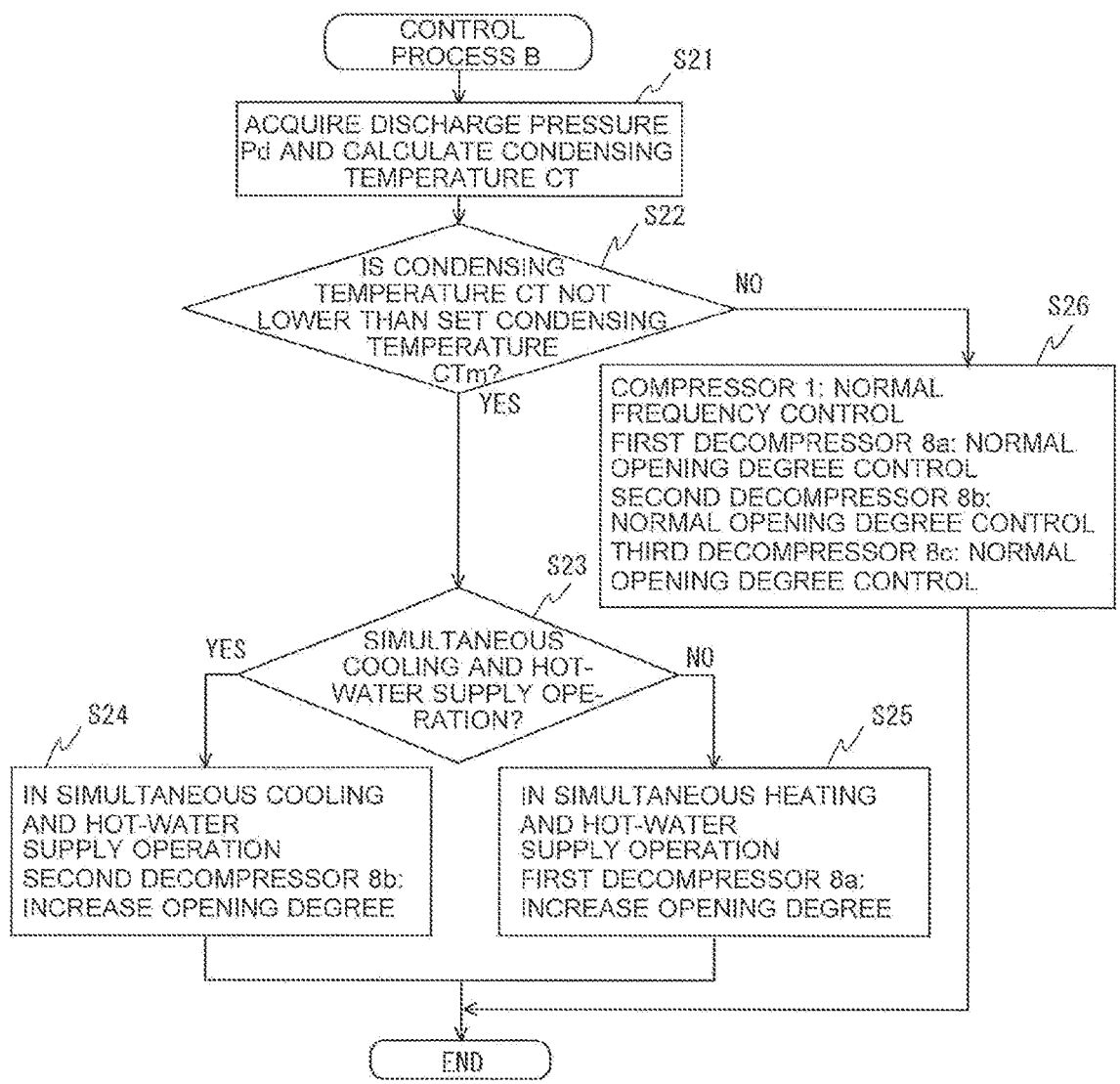
FIG. 9 is a flowchart of a process of determination of whether high-temperature hot-water supply or other hot-water supply (normal hot-water supply) is performed in an energy saving prioritized mode in which energy saving is prioritized at the heat-pump air-conditioning hot-water supply device, according to Embodiment 1 of the present invention.

FIG. 9 is a flowchart of a process of determination of whether high-temperature hot-water supply or other hot-water supply (normal hot-water supply) is performed in the energy saving prioritized mode in which energy saving is prioritized at the heat-pump air-conditioning hot-water supply device, according to Embodiment 1 of the present invention. The following describes a control operational procedure in the energy saving prioritized mode in which energy saving is prioritized at the heat-pump air-conditioning hot-water supply device 100.

When the energy saving prioritized mode (control process B) is started, the calculation unit 21 first acquires the discharge pressure Pd of the compressor 1 and calculates the condensing temperature CT (step S21). Subsequently, the calculation unit 21 determines whether the condensing temperature CT is not lower than the set condensing temperature CTm (step S22). The set condensing temperature CTm for the condensing temperature is, for example, the maximum value (for example, 60 degrees C.) of the proper use range of the compressor 1.

In step S22, when the condensing temperature CT is not lower than the set condensing temperature CTm, the calculation unit 21 determines whether the simultaneous cooling and hot-water supply operation or the simultaneous heating and hot-water supply operation is performed (step S23).

In step S23, when the simultaneous cooling and hot-water supply operation is performed, the opening degree control unit 25 increases the opening degree of the second decompressor 8b (step S24). At this time, the output of the compressor 1 is controlled for the normal simultaneous cooling and hot-water supply operation.

In step S23, when the simultaneous heating and hot-water supply operation is performed, the opening degree control unit 25 increases the opening degree of the first decompressor 8a (step S25). At this time, the output of the compressor 1 is controlled for the simultaneous heating and hot-water supply operation.

In step S22, when the condensing temperature CT is lower than the set condensing temperature CTm, the output of the compressor 1 and the opening degrees of the first decompressor 8a, the second decompressor 8b, and the third decompressor 8c are controlled for the normal simultaneous cooling and hot-water supply operation or the normal simultaneous heating and hot-water supply operation (step S26).

As described above, in the control in which energy saving of power consumption is prioritized, the opening degree control unit 25 increases the opening degrees of the decompressors. Thus, excessive rise of the condensing temperature can be reduced and the frequency of the compressor can be maintained high, thereby allowing the simultaneous cooling and hot-water supply operation or the simultaneous heating and hot-water supply operation to continue as long as possible. Consequently, the number of opportunities can be reduced in which the external heat source 53 such as an electric heater has to be activated to largely affect electricity cost.

REFERENCE SIGNS LIST 1 compressor 2 flow switching device 3 outdoor-side heat exchanger
4 accumulator 5 first solenoid valve 6 second solenoid valve 7 third solenoid valve 8a first decompressor 8b second decompressor 8c third decompressor 9 stop valve 10 indoor-side air-conditioning heat exchanger 11 hot-water supply heat exchanger 12 compressor shell temperature sensor 13 discharge pipe temperature sensor 14 outdoor-side heat exchanger temperature sensor 15 external air temperature sensor 16 indoor-side air-conditioning heat exchanger liquid pipe temperature sensor 17 hot-water supply heat exchanger liquid pipe temperature sensor 18 pressure sensor
20 control device 21 calculation unit 22 output control unit 23 opening and closing control unit 24 switching control unit 25 opening degree control unit 26 operation mode selecting unit 27 heat source control unit 28 pump control unit 30 outdoor unit 40 indoor unit 50 water indoor unit 51 circulation pump 52 hot-water tank 53 external heat source
100 heat-pump air-conditioning hot-water supply device 160 remote controller

The invention claimed is:

1. A heat-pump air-conditioning hot-water supply device comprising:
a first refrigerant passage connecting a compressor, a first solenoid valve, a flow switch, an outdoor-side heat exchanger, at least one decompressor, and an indoor-side air-conditioning heat exchanger;
a second refrigerant passage branching from between the compressor and the first solenoid valve and connecting a second solenoid valve, a hot-water supply heat exchanger, and the at least one decompressor;
a hot-water tank connected with a hot-water supply circuit connected with the hot-water supply heat exchanger;
an external heat source configured to heat water inside the hot-water tank;
a pressure sensor configured to measure discharge pressure of the compressor; and
a controller configured to adjust an operational frequency of the compressor and adjust an opening degree of a valve of the at least one decompressor,
the controller including a heat source controller configured to control activation of the external heat source,
the at least one decompressor including a first decompressor connected with the outdoor-side heat exchanger, a second decompressor connected with the indoor-side air-conditioning heat exchanger, and a third decompressor connected with the hot-water supply heat exchanger,
the controller being configured to
calculate a condensing temperature from the discharge pressure,
perform operation in one of an air conditioning prioritized mode in which a preset operational frequency of the compressor is changed, and an energy saving prioritized mode in which the opening degree of the valve of the at least one decompressor is changed, when the condensing temperature is not lower than a set condensing temperature,
reduce the operational frequency of the compressor in a simultaneous cooling and hot-water supply operation in the air conditioning prioritized mode or a simultaneous heating and hot-water supply operation in the air conditioning prioritized mode, and
perform a cooling-only operation by opening the first solenoid valve, closing the second solenoid valve, fully opening the first decompressor, closing the third decompressor, and adjusting an opening degree of the second decompressor, when the operational frequency of the compressor decreases to a lowest frequency and the condensing temperature is not lower than the set condensing temperature in the simultaneous cooling and hot-water supply operation in the air conditioning prioritized mode, and
the heat source controller being configured to activate the external heat source when the operational frequency of the compressor decreases to the lowest frequency and the condensing temperature is not lower than the set condensing temperature.

2. The heat-pump air-conditioning hot-water supply device of claim 1, wherein
the controller is configured to increase the opening degree of the second decompressor when the condensing temperature is not lower than the set condensing temperature in the simultaneous cooling and hot-water supply operation in the energy saving prioritized mode.

3. A heat-pump air-conditioning hot-water supply device comprising:
a first refrigerant passage connecting a compressor, a first solenoid valve, a flow switch, an outdoor-side heat exchanger, at least one decompressor, and an indoor-side air-conditioning heat exchanger;
a second refrigerant passage branching from between the compressor and the first solenoid valve and connecting a second solenoid valve, a hot-water supply heat exchanger, and the at least one decompressor;

a hot-water tank connected with a hot-water supply circuit connected with the hot-water supply heat exchanger;

an external heat source configured to heat water inside the hot-water tank;

a pressure sensor configured to measure discharge pressure of the compressor; and a controller configured to adjust an operational frequency of the compressor and adjust an opening degree of a valve of the at least one decompressor, the controller including a heat source controller configured to control activation of the external heat source, the at least one decompressor including a first decompressor connected with the outdoor-side heat exchanger, a second decompressor connected with the indoor-side air-conditioning heat exchanger, and a third decompressor connected with the hot-water supply heat exchanger, the controller being configured to
calculate a condensing temperature from the discharge pressure,
perform operation in one of an air conditioning prioritized mode in which a preset operational frequency of the compressor is changed, and an energy saving prioritized mode in which the opening degree of the valve of the at least one decompressor is changed, when the condensing temperature is not lower than a set condensing temperature,
reduce the operational frequency of the compressor in a simultaneous cooling and hot-water supply operation in the air conditioning prioritized mode or a simultaneous heating and hot-water supply operation in the air conditioning prioritized mode, and
perform a heating-only operation by opening the first solenoid valve, closing the second solenoid valve, fully opening the second decompressor, closing the third decompressor, and adjusting an opening degree of the first decompressor, when the operational frequency of the compressor decreases to a lowest frequency and the condensing temperature is not lower than the set condensing temperature in the simultaneous heating and hot-water supply operation in the air conditioning prioritized mode, and the heat source controller being configured to activate the external heat source when the operational frequency of the compressor decreases to the lowest frequency and the condensing temperature is not lower than the set condensing temperature.

4. The heat-pump air-conditioning hot-water supply device of claim 3, wherein
the controller is configured to increase a sum of opening degrees of the first decompressor and the second decompressor when the condensing temperature is not lower than the set condensing temperature in the simultaneous heating and hot-water supply operation in the energy saving prioritized mode.

* * * * *